(12) United States Patent
Wenske et al.

(10) Patent No.: US 12,504,088 B2
(45) Date of Patent: Dec. 23, 2025

(54) VALVE MODULE, VALVE ARRANGEMENT AND METHOD

(71) Applicant: Festo SE & Co. KG, Esslingen (DE)

(72) Inventors: Eduard Wenske, Kornwestheim (DE); Gregor Appt, Esslingen (DE)

(73) Assignee: Festo SE & Co. KG, Esslingen (DE)

( * ) Notice: Subject to any disclaimer, the term of this patent is extended or adjusted under 35 U.S.C. 154(b) by 592 days.

(21) Appl. No.: 17/802,781

(22) PCT Filed: Nov. 17, 2020

(86) PCT No.: PCT/EP2020/082368
§ 371 (c)(1),
(2) Date: Aug. 26, 2022

(87) PCT Pub. No.: WO2021/170265
PCT Pub. Date: Sep. 2, 2021

(65) Prior Publication Data
US 2023/0081268 A1 Mar. 16, 2023

(30) Foreign Application Priority Data
Feb. 28, 2020 (DE) .................. 10 2020 202 577.0

(51) Int. Cl.
| | |
|---|---|
| *F16K 27/00* | (2006.01) |
| *F15B 13/08* | (2006.01) |
| *F16K 27/04* | (2006.01) |
| *F16K 31/40* | (2006.01) |
| *F16K 37/00* | (2006.01) |

(52) U.S. Cl.
CPC ........ *F16K 27/003* (2013.01); *F15B 13/0817* (2013.01); *F15B 13/0821* (2013.01);
(Continued)

(58) Field of Classification Search
CPC .... F16K 27/048; F16K 27/041; F16K 27/003; F16K 31/40; F16K 37/005;
(Continued)

(56) References Cited

U.S. PATENT DOCUMENTS

| | | |
|---|---|---|
| 2003/0180154 A1 | 9/2003 | Yamazaki et al. |
| 2004/0003850 A1 | 1/2004 | Miyazoe et al. |

(Continued)

FOREIGN PATENT DOCUMENTS

| | | |
|---|---|---|
| CN | 1854583 A | 11/2006 |
| CN | 101990605 A | 3/2011 |

(Continued)

OTHER PUBLICATIONS

Chinese Office Action dated Sep. 26, 2024.

*Primary Examiner* — Atif H Chaudry
(74) *Attorney, Agent, or Firm* — Hoffmann & Baron, LLP

(57) ABSTRACT

A valve module (1) for mounting on a valve module carrier (2), the valve module (1) being of plate-shaped design, extending in a longitudinal direction (x), and being subdivided into a plurality of longitudinal sections adjoining one another in the longitudinal direction (x), the valve module having, as a first longitudinal section, a main valve section (8) with a first main valve (9), and, as a second longitudinal section adjoining the main valve section (8) in the longitudinal direction (x), a pilot section (10) with a pilot valve (11) for actuating the first main valve (9), the valve module (1) further having, as a third longitudinal section adjoining the pilot section (10) in the longitudinal direction (x), a pressure sensor section (12) with a pressure sensor (13) for detecting a fluid pressure of the valve module (1).

11 Claims, 6 Drawing Sheets

(52) U.S. Cl.
CPC ...... *F15B 13/0825* (2013.01); *F15B 13/0839* (2013.01); *F15B 13/086* (2013.01); *F16K 27/041* (2013.01); *F16K 27/048* (2013.01); *F16K 31/40* (2013.01); *F16K 37/005* (2013.01)

(58) Field of Classification Search
CPC .............. F15B 13/0817; F15B 13/0825; F15B 13/0821; F15B 13/0839; F15B 2211/36
See application file for complete search history.

(56) References Cited

U.S. PATENT DOCUMENTS

| | | | |
|---|---|---|---|
| 2006/0237068 A1 | 10/2006 | Miyazoe et al. | |
| 2008/0230133 A1* | 9/2008 | Garner | F15B 13/0896 137/884 |
| 2009/0205724 A1 | 8/2009 | Brenner et al. | |
| 2011/0030964 A1 | 2/2011 | Williams | |
| 2011/0192481 A1 | 8/2011 | Wenske et al. | |

FOREIGN PATENT DOCUMENTS

| | | | | |
|---|---|---|---|---|
| CN | 107218264 A | 9/2017 | | |
| DE | 603 00 225 T2 | 12/2005 | | |
| DE | 102013016652 A1 * | 4/2015 | .......... | F15B 13/0896 |
| DE | 102018200680 A1 * | 7/2019 | | |
| EP | 1 223 372 A2 | 7/2002 | | |
| WO | 2012/076035 A1 | 6/2012 | | |
| WO | 2016/198094 A1 | 12/2016 | | |

* cited by examiner

VALVE MODULE, VALVE ARRANGEMENT AND METHOD

This is a National Stage application based on International Application No. PCT/EP2020/082368, filed on Nov. 17, 2020, which claims priority to DE 102020202577.0, filed Feb. 28, 2020.

BACKGROUND OF THE INVENTION

The invention relates to a valve module for mounting on a valve module carrier, wherein the valve module is plate-shaped, extends in a longitudinal direction, and is divided into a plurality of longitudinal sections adjoining one another in the longitudinal direction, wherein the valve module has, as a first longitudinal section, a main valve section with a first main valve, and, as a second longitudinal section adjoining the main valve section in the longitudinal direction, a pilot section with a pilot valve for actuating the first main valve.

SUMMARY OF THE INVENTION

It is an object of the invention to increase operational safety in a space-efficient manner.

The object is solved by a valve module according to claim 1. The valve module comprises, as a third longitudinal section adjoining the pilot section in longitudinal direction, a pressure sensor section with a pressure sensor for detecting a fluid pressure of the valve module.

The pressure sensor can be used in particular to verify whether a pressurized fluid outlet of the valve module that can be de-aerated via the main valve is actually de-aerated. Consequently, by means of the pressure sensor section operational reliability can be increased.

In conventional plate-shaped valve modules, a further pilot section or a placeholder module (also referred to as a "dummy solenoid") adjoins the pilot section in the longitudinal direction. In the valve module according to the invention, the pressure sensor section is now present instead of this second pilot section (or the dummy module). Preferably, the valve module according to the invention does not require more installation space (especially in the longitudinal direction) than a conventional valve module with two pilot sections or one pilot section and one placeholder module. Consequently, the valve module according to the invention is designed to be space-efficient.

Advantageous embodiments are defined in the dependent claims.

According to a preferred embodiment, the pressure sensor serves to detect the fluid pressure of a pressurized fluid supply outlet of the valve module, which pressurized fluid supply outlet is switched by the first main valve. The pressurized fluid supply outlet is used to supply pressurized fluid to further valve modules located on the valve module carrier. The pressurized fluid supply outlet can be selectively aerated or de-aerated via the first main valve.

The invention further relates to a valve arrangement comprising a valve module carrier on which a first valve module is mounted, which is formed according to the valve module explained above, and on which valve module carrier at least one second valve module is mounted, which second valve module is arranged on the valve module carrier offset from the first valve module in a line-up direction aligned perpendicular to the longitudinal direction, the second valve module having a second main valve and being adapted to use the pressurized fluid supplied by the first valve module via the pressurized fluid supply outlet to actuate the second main valve.

The invention further relates to a method of operating the valve module or valve arrangement described above, comprising the steps of: de-aerating the pressurized fluid supply outlet by means of the main valve; and verifying the de-aeration of the pressurized fluid supply outlet by means of the pressure sensor.

BRIEF DESCRIPTION OF THE DRAWINGS

Further exemplary details as well as exemplary embodiments are explained below with reference to the figures. Thereby shows FIG. 1 a perspective view of a valve module, FIG. 2 a pressure sensor module according to a first variant, FIG. 3 a pressure sensor module according to a second variant, FIG. 4 a fluidic circuit diagram of the valve module, FIG. 5 a perspective view of a valve arrangement, FIG. 6 a fluidic circuit diagram of a system comprising the valve arrangement, and FIG. 7 a sectional view of the valve arrangement.

DETAILED DESCRIPTION

Figure 1:
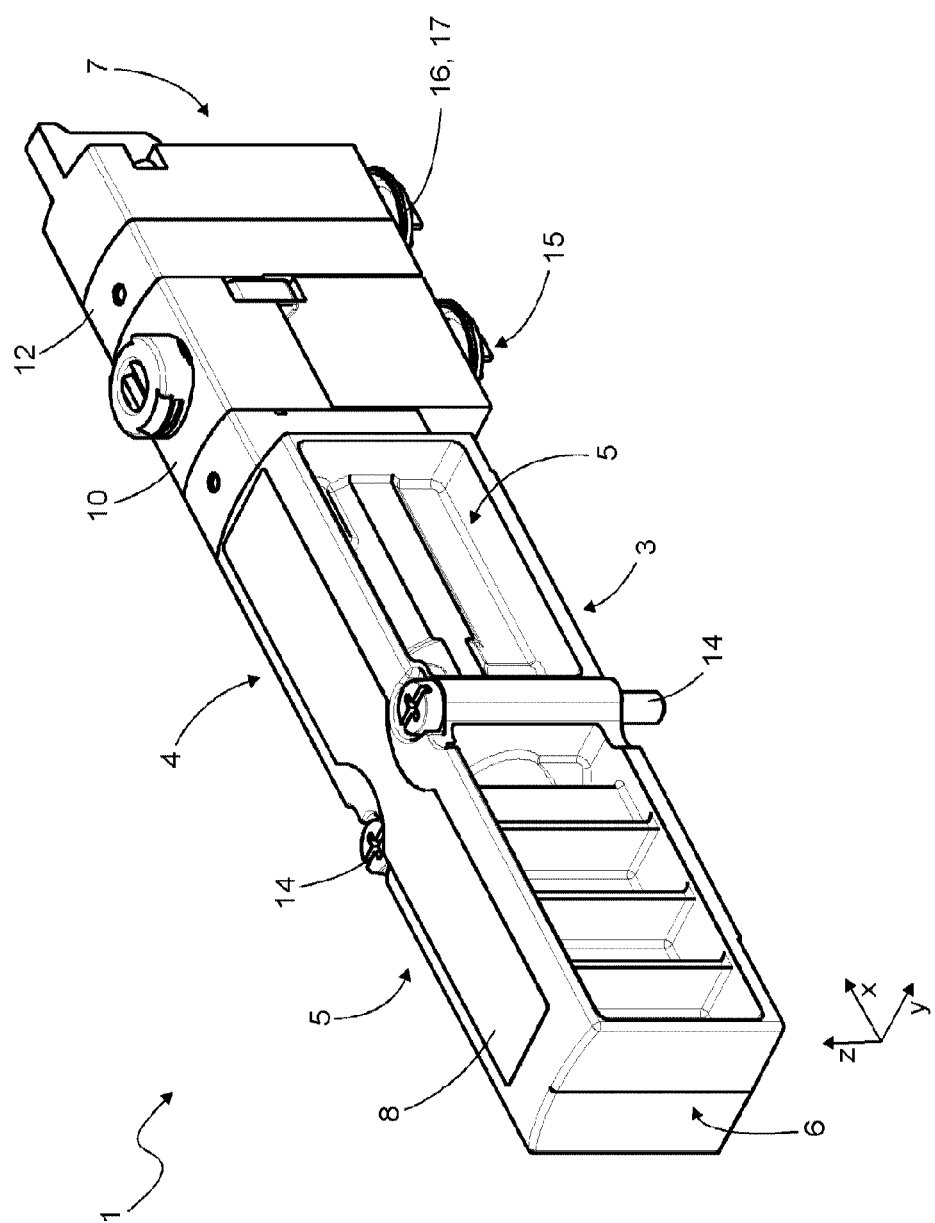

FIG. 1 shows a valve module 1. The valve module 1 is to be mounted on a valve module carrier 2 (exemplarily shown in FIGS. 5 and 7). The valve module 1 is expediently a pneumatic valve module. The pressurized fluid referred to below is, in particular, compressed air. The valve module 1 serves in particular for use in industrial automation.

The valve module 1 extends with its longitudinal axis in a longitudinal direction x, which can also be referred to as the x-direction. The x-direction is a horizontal direction. Orthogonal to the x-direction is a y-direction, which can also be referred to as the width direction or line-up direction. The y-direction is a horizontal direction. Orthogonal to the x-direction and orthogonal to the y-direction is a z-direction, which may also be referred to as the height direction. The z-direction is a vertical direction.

The valve module 1 has a plate-shaped design. In particular, the valve module 1 has an elongated and/or flat basic shape. Exemplarily, the x-extension of the valve module 1 is many times larger than the y-extension of the valve module 1, for example at least five times as large. Furthermore, the x-extension of the valve module 1 is many times larger than the z-extension of the valve module 1, for example at least twice as large. Exemplarily, the z-extension of the valve module 1 is larger than the y-extension of the valve module 1.

The valve module 1 has an exemplary cuboid basic shape. The valve module 1 has a bottom side 3 (aligned perpendicular to the z-direction). The bottom side 3 is that side of the valve module 1 with which the valve module 1 can be attached (or is attached) to the valve module carrier 2. In particular, the bottom side 3 is that side which rests on a top side of the valve module carrier 2 when the valve module 1 is attached to the valve module carrier 2.

The valve module 1 further comprises a top side 4 that is oriented opposite to the bottom side 3. Thus, the top side 4 is the side that faces away from the valve module carrier 2 when the valve module 1 is mounted on the valve module carrier 2. The top side 4 is oriented perpendicular to the z-direction. The valve module 1 further has longitudinal sides 5 oriented perpendicular to the y-direction (and opposite to each other). The valve module 1 further has a front end face 6 oriented in particular perpendicular to the x-direction and a rear end face 7 oriented in particular perpendicular to the x-direction. The front end face 6 and the rear end face 7 are oriented opposite to each other.

The valve module 1 is divided into a plurality of longitudinal sections adjoining each other in the longitudinal direction x. The first longitudinal section of the valve module 1 is a main valve section 8 comprising a first main valve 9 (exemplarily shown in FIGS. 4, 6 and 7). The second longitudinal section of the valve module 1 is a pilot section 10, which adjoins the main valve section 8 in the longitudinal direction x. The pilot section 10 comprises a pilot valve 11 (exemplarily shown in FIGS. 4, 6 and 7) which serves to actuate the first main valve 9. The third longitudinal section of the valve module 1 is a pressure sensor section 12 adjoining the pilot section 10 in the longitudinal direction x. The pressure sensor section 12 comprises a pressure sensor 13 configured to detect a fluid pressure of the valve module 1.

The longitudinal sections of the valve module 1—i.e. the main valve section 8, the pilot section 10 and the pressure sensor section 12—each expediently have a cuboidal basic shape and expediently placed onto one another in the longitudinal direction x, in particular in a non-overlapping manner in the longitudinal direction x. The main valve section 8 provides, exemplarily, the front end face 6 of the valve module 1. The pressure sensor section 12 provides, exemplarily, the rear end face 7 of the valve module 1. The main valve section 8 and the pilot section 10 are attached to each other with respective end faces aligned perpendicular to the x-direction. The pilot section 10 and the pressure sensor section 12 are attached to each other with respective end faces aligned perpendicular to the x-direction.

The x-extension of the main valve section 8 is expediently greater than the x-extension of the pilot section 10 and/or greater than the x-extension of the pressure sensor section 12. Exemplarily, the x-extension of the main valve section 8 is at least three times as large as the x-extension of the pilot section 10 and/or at least three times as large as the x-extension of the pressure sensor section 12. The x-extension of the pressure sensor section is expediently between 80% and 120% of the x-extension of the pilot section 10.

The valve module 1 expediently comprises at least one fastening unit 14 for fastening the valve module 1 to the valve module carrier 2. Exemplarily, two fastening units 14 are present, which are expediently arranged on the main valve section 8. Exemplarily, each fastening unit 14 is designed as a screw.

The valve module 1 further comprises an electrical terminal 15 for electrically connecting the valve module 1 to the valve module carrier 2. The electrical terminal 15 may also be referred to as a pilot terminal. Exemplarily, the electrical terminal 15 is arranged on the pilot section 10, in particular on the bottom side thereof. The electrical terminal 15 expediently comprises one or more plug contacts. The electrical terminal 15 is used in particular to receive an electrical control signal with which the pilot valve 11 is actuated. Via the electrical terminal 15, an electrical contact is expediently established with an electrical concatenation, in particular a printed circuit board 54, of the valve module carrier 2. Via the electrical concatenation, a serial communication is expediently effected. The control signal is, for example, switching information, in particular a switching specification. The control signal is in particular a digital, expediently serial, signal or an analog signal.

Preferably, the pressure sensor section 12 is designed as a pressure sensor module that is placed onto the pilot section 10 in the longitudinal direction x. The pressure sensor section 12 is expediently designed plate-shaped. In particular, the pressure sensor section 12 has a cuboidal basic shape. The z-extension of the pressure sensor section 12 is preferably greater than the x-extension of the pressure sensor section and greater than the y-extension of the pressure sensor section. The pressure sensor section 12 is expediently detachable from the pilot section 10.

Expediently, furthermore, the main valve section 8 is designed as a (in particular plate-shaped) main valve module and/or the pilot section 10 is designed as a (in particular plate-shaped) pilot control module. The pressure sensor module, the pilot control module and the main valve module represent submodules of the valve module 1 and together form the valve module 1. Expediently, the valve module 1 consists exclusively of the pressure sensor module, the pilot control module and the main valve module.

Figure 2:
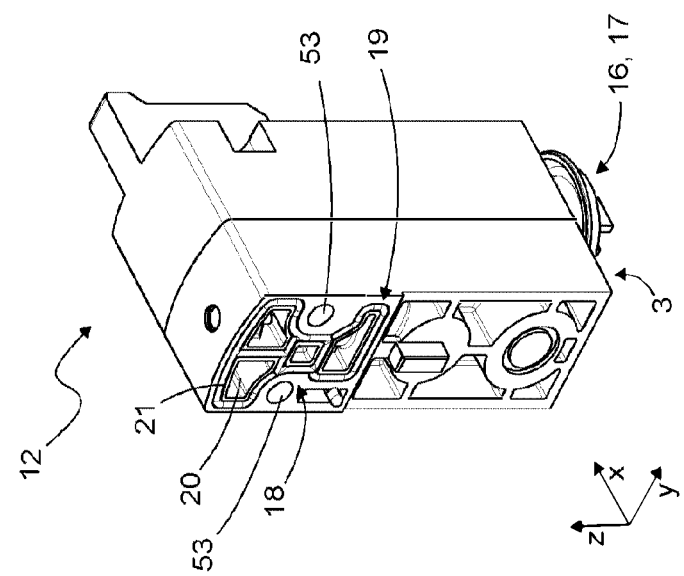

FIG. 2 shows the pressure sensor section 12 (formed as a pressure sensor module) in a state removed from the pilot section 10.

The pressure sensor section 12 comprises a connection side 18 aligned perpendicular to the x-direction, with which the pressure sensor section 12 is to be placed onto or is placed onto to the pilot section 10. The pressure sensor section 12 comprises a fluidic interface 19, with which the pressure sensor section 12 is fluidically connectable or connected to the pilot section 10. The fluidic interface 19 is arranged on the connection side 18, exemplarily in the upper half of the connection side 18. The fluidic interface 19 comprises a fluid opening 20, exemplarily surrounded by a seal 21.

The pressure sensor section 12 further comprises at least one fastening section 53 for fastening the pressure sensor section 12 to the pilot section 10. Preferably, two fastening sections 53 are provided, expediently on the connection side 18. Each fastening section 53 is expediently configured as a hole for receiving a screw.

The pressure sensor section 12 includes an electrical interface 16 for providing fluid pressure information detected by the pressure sensor 13 and/or to receive a control signal to actuate the pilot valve 11.

Preferably, the electrical interface 16 comprises a first electrical terminal 17 arranged on the bottom side (aligned perpendicular to the z-direction) of the pressure sensor section 12. Exemplarily, the first electrical terminal 17 comprises one or more plug contacts. The first electrical terminal 17 is used, in particular, to provide the fluid pressure information and/or to receive the control signal. Via the electrical terminal 17, an electrical contact to the electrical concatenation, in particular the printed circuit board 54, of the valve module carrier 2 is expediently established. Serial communication in particular takes place via the first electrical terminal 17.

Figure 3:
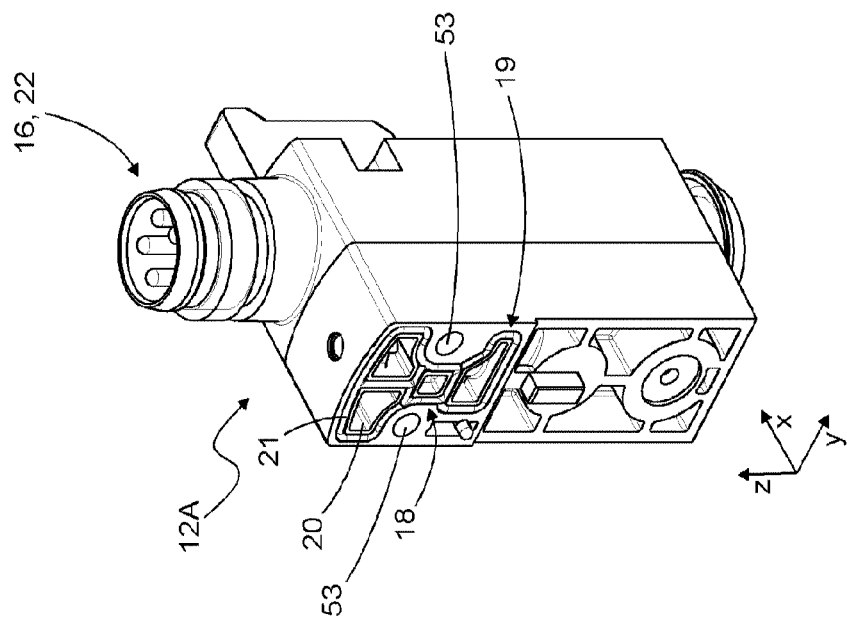

FIG. 3 shows a pressure sensor section 12A, which represents a possible further development of the pressure sensor section 12. In the pressure sensor section 12A, the electrical interface 16 comprises a second electrical terminal 22 (in particular alternatively or additionally to the first electrical terminal 17). In an exemplary embodiment, the second electrical terminal 22 is arranged on the top side (aligned perpendicular to the z-direction) of the pressure sensor section 12A. Suitably, the second electrical terminal 22 comprises one or more plug contacts. Preferably, the second electrical terminal 22 is designed as a plug terminal for a cable, in particular as an M8 plug connection. Via the second electrical terminal 22, an individual connection of the pressure sensor section 12A to a control system is expediently possible. In particular, a separate communication path to the pressure sensor section 12A can be provided by means of the second electrical terminal 22, in particular in addition to an already existing communication path to the pilot section 10. Expediently, a first communication path runs to the pilot section 10, in particular to the electrical terminal 15, via the printed circuit board 54 of the valve module carrier 2. The first communication path runs in particular inside the valve module carrier 2. Furthermore, a second communication path runs to the pressure sensor section 12A, in particular to the second electrical terminal 22, in particular via cables and/or outside the valve module carrier 2.

Figure 4:
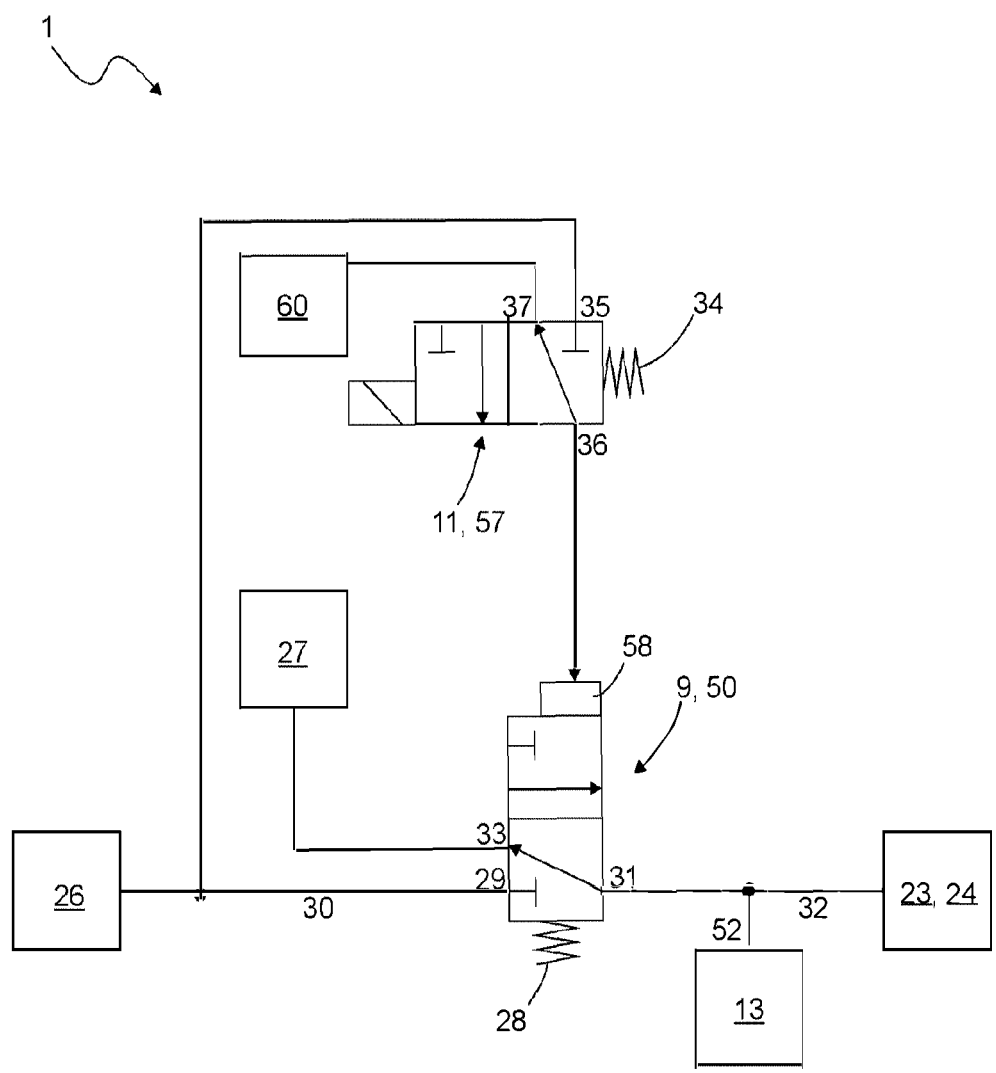

FIG. 4 shows an exemplary fluidic circuit diagram of the valve module 1.

Exemplarily, the pressure sensor 13 is used to detect the fluid pressure of a pressurized fluid outlet 23 of the valve module 1, which pressurized fluid outlet 23 is switched by the first main valve 9. The pressure sensor 13 is fluidically connected to the pressurized fluid outlet 23.

Figure 5:
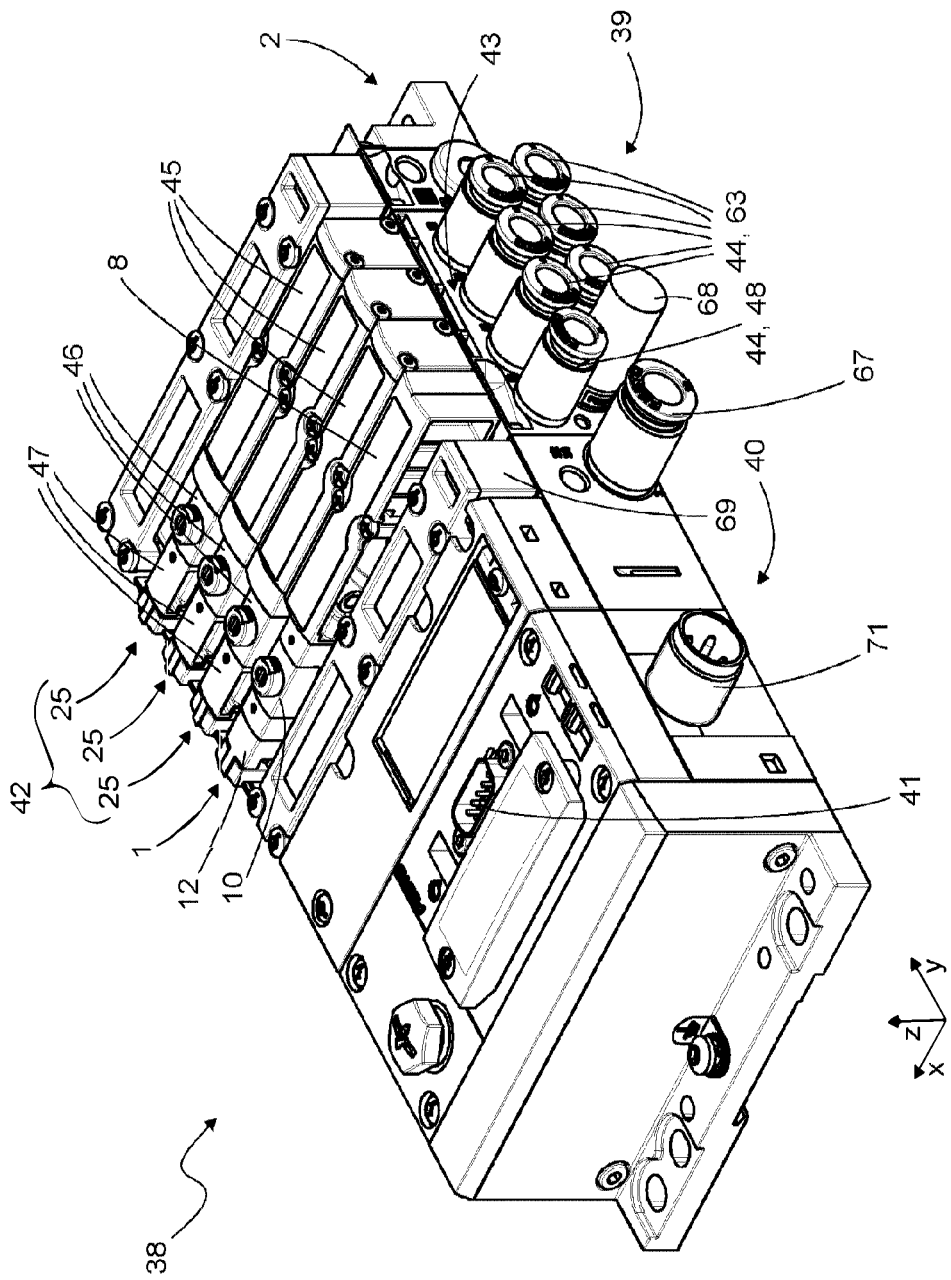
Figure 6:
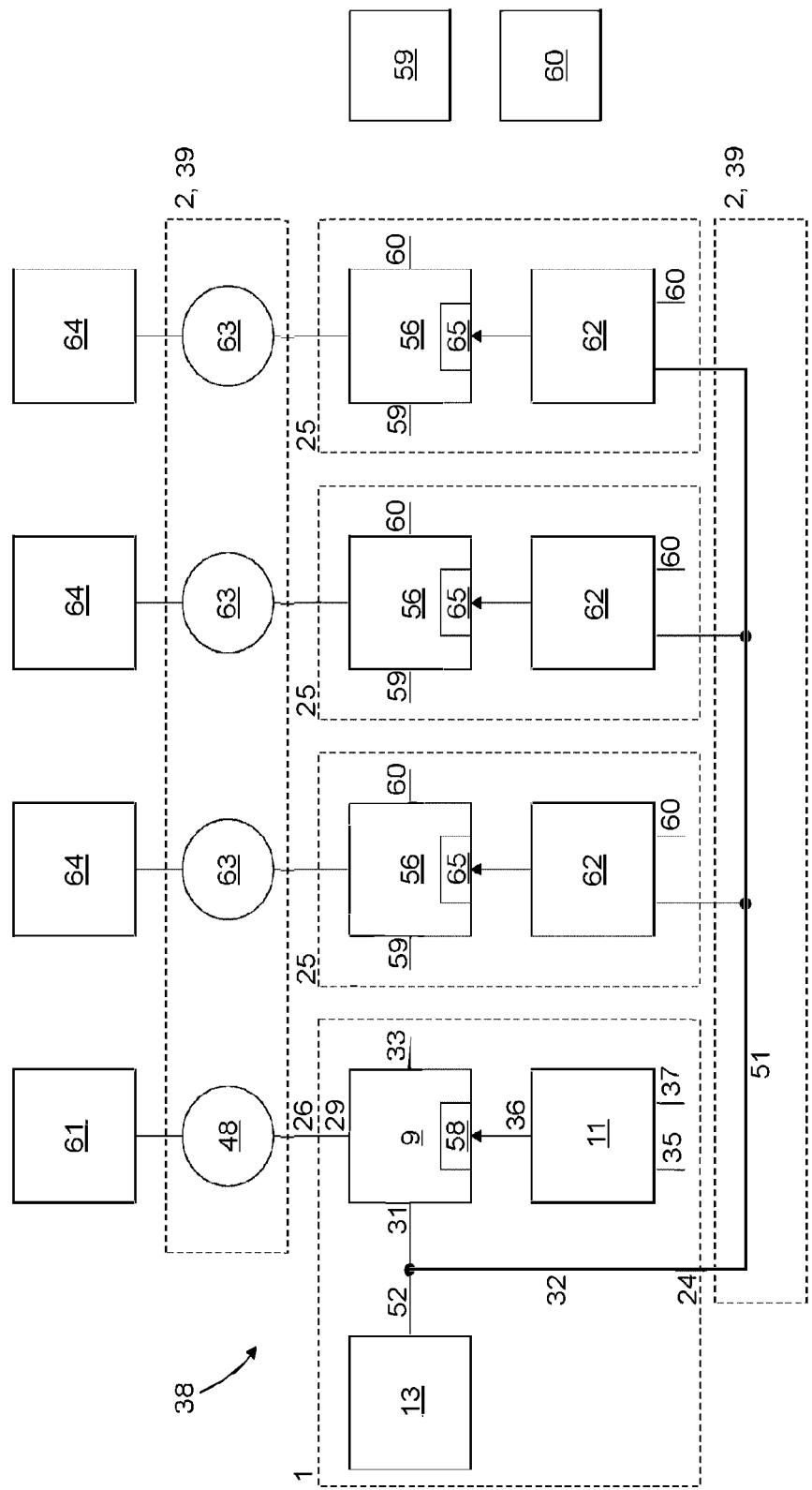

Expediently, the pressurized fluid outlet 23 is a pressurized fluid supply outlet 24 for supplying pressurized fluid to further valve modules 25 located on the valve module carrier 2 (see FIGS. 5 and 6). The pressurized fluid supply outlet 24 is selectively being aerated or de-aerated via the first main valve 9.

Exemplarily, the valve module 1 comprises a pressurized fluid supply inlet 26, which is connected, for example, to an external pressurized fluid source 61 (see FIG. 6), in particular a compressed air source. The first main valve 9 is configured to selectively assume a first main valve position or a second main valve position. The main valve 9 comprises a main valve member 50. The term "main valve position" refers to the position of the main valve member 50.

In the first main valve position, the first main valve 9 interrupts the fluidic connection between the pressurized fluid supply inlet 26 and the pressurized fluid supply outlet 24. Exemplarily, the valve module 1 further comprises a de-aeration outlet 27. The de-aeration outlet 27 is expediently fluidically connected to a pressurized fluid sink 60, for example to the environment of the valve module 1, in particular the atmosphere. In the first main valve position, the first main valve 9 expediently provides a fluidic connection between the de-aeration outlet 27 and the pressurized fluid supply outlet 24 to de-aerate the pressurized fluid supply outlet 24 via the de-aeration outlet 27.

Exemplarily, the de-aeration outlet 27 is fluidically connected to a silencer 68, in particular a screw-in silencer. The pressurized fluid is discharged into the pressurized fluid sink 60 via the silencer 68. The silencer 68 is shown, for example, in FIGS. 5 and 7. The silencer 68 is arranged exemplarily at a front side 43 of the valve module carrier 2. In particular, the silencer 68 is arranged below a pressurized fluid supply port 48. The silencer 68 is of cylindrical design, for example.

In the second main valve position, the main valve 9 provides a fluidic connection between the pressurized fluid supply inlet 26 and the pressurized fluid supply outlet 24; the pressurized fluid supply outlet 24 is aerated.

The main valve 9 expediently comprises a first spring element 28. The first main valve 9 is designed in particular as a single-acting valve. Expediently, the first main valve 9 is a monostable valve. Preferably, the main valve 9 is set by means of the spring element 28 into one of the two aforementioned main valve positions, exemplarily into the first main valve position, and is set by means of the fluidic actuation from the pilot valve 11 into the other main valve position, exemplarily the second main valve position. Purely by way of example, the first main valve 9 is a 3/2-way valve.

In an exemplary embodiment, the first main valve 9 comprises a first main valve port 29 fluidically connected to the pressurized fluid supply inlet 26 via a first valve module fluid channel 30. In the first main valve position, the main valve 9 closes the first main valve port 29. In the second main valve position, the main valve 9 connects the first main valve port 29 to a second main valve port 31 that is fluidically connected to the pressurized fluid supply outlet 24 via a second main valve fluid channel 32.

According to another embodiment, the main valve port 29 is connected to a pressurized fluid supply 59, for example, via a working fluid channel 66 and/or a working fluid supply port 67.

The first main valve 9 further comprises a third main valve port 33 fluidically connected to the de-aeration outlet 27. In the first position, the first main valve 9 fluidically connects the third main valve port 33 to the second main valve port 31. In the second position, the first main valve 9 closes the third main valve port 33.

The pilot valve 11 serves to actuate the first main valve 9, in particular to put the first main valve 9 into the second main valve position. In an exemplary embodiment, the pilot valve 11 comprises a second spring element 34. The pilot valve 11 can expediently be set in two different pilot valve positions—a first pilot valve position in which the pilot valve 11 does not actuate the first main valve 9 and a second pilot valve position in which the pilot valve 11 fluidically actuates the first main valve 9. The pilot valve 11 includes a pilot valve member 57, and the term "pilot valve position" refers to the position of the pilot valve member 57.

Exemplarily, the pilot valve 11 is designed as a solenoid valve and assumes one of the two pilot valve positions, in particular the second pilot valve position, by magnetic actuation. The pilot valve 11 expediently assumes the first pilot valve position by actuation by the second spring element 34.

The first main valve 9 has a pressure chamber 58, by aerating of which the main valve 9 can be moved into the second main valve position. In the first pilot valve position, the pressure chamber 58 is de-aerated via the pilot valve 11, for example into the pressurized fluid sink 60. Furthermore, in the second pilot valve position, the pressure chamber 58 is aerated via the pilot valve 11, for example from the pressurized fluid supply inlet 26.

The pilot valve 11 includes a first pilot valve port 35 fluidically connected to the pressurized fluid source 61 (for example, via the pressure supply inlet 26) and/or a pressurized fluid supply 59 (see FIG. 6). In the first pilot valve position, the pilot valve 11 expediently closes the first pilot valve port 35. In the second pilot valve position, the pilot valve 11 expediently fluidically connects the first pilot valve port 35 to a second pilot valve port 36. The second pilot valve port 36 is fluidically connected to the pressure chamber 58 of the first main valve 9. The pilot valve 11 further comprises a third pilot valve port 37 fluidically connected to a pressurized fluid sink 60 (see FIGS. 4,6) and/or (according to a further embodiment) the de-aeration outlet 27. The third pilot valve port 37 is preferably fluidically connected directly—i.e. in particular not via a silencer, such as the silencer 68 or the area silencer 69—to the pressurized fluid sink 60. For example, de-aerating directly to atmosphere occurs via the third pilot valve port 37. In the first pilot valve position, the pilot valve 11 fluidically connects the third pilot valve port 37 to the second pilot valve port 36. In the second pilot valve position, the pilot valve 11 expediently closes the third pilot valve port 37

The pressure sensor 13 is fluidically connected to the pressurized fluid supply outlet 24. Exemplarily, the pressure sensor 13 is fluidically connected to the second valve module fluid channel 32. Expediently, the valve module 1 is configured to use the pressure sensor 13 to verify whether the pressurized fluid supply outlet 24 is de-aerated.

FIG. 5 shows a valve arrangement 38 comprising the valve module carrier 2 and the valve module 1. The valve module 1 shall also be referred to as the first valve module 1 hereinafter. The first valve module 1 is mounted on the valve module carrier 2. The valve arrangement 38 further comprises at least one further valve module 25. Exemplarily, the valve module arrangement 38 comprises a plurality of further valve modules 25. Each further valve module 25 shall also be referred to hereinafter as a second valve module 25. The entirety of second valve modules 25 shall also be referred to as valve module arrangement 42. The following explanations, which refer to a second valve module 25, are expediently applicable to several or all second valve modules 25.

The valve module carrier 2 is aligned with its longitudinal axis parallel to the y-direction. The valve module carrier 2 has a top side that is aligned perpendicular to the z-direction. The first valve module 1 and the second valve modules 25 are mounted on the top side. In particular, the valve module carrier 2 has a plurality of mounting locations on its top side, which are equipped with the first valve module 1 and the second valve modules 25.

The valve module carrier 2 exemplarily comprises a control section 40. The control section 40 expediently serves to provide electrical control signals to the first valve module 1 and/or the second valve modules 25, in particular via the electrical concatenation, preferably via the printed circuit board 54, of the valve module carrier 2. The control section 40 expediently further serves to receive the fluid pressure information and/or a verification information from the pressure sensor 13. Exemplarily, the control section 40 has a basic cuboidal shape. The control section 40 further comprises a communication interface 41. In particular, the communication interface 41 is used for communication with a higher-level controller. Expediently, the communication interface 41 serves to receive a control command, on the basis of which the control section 40 provides the electrical control signals for actuating the first valve module 1 and/or the second valve modules 25. Furthermore, the communication interface 41 is expediently used for transmitting the fluid pressure information and/or a verification information, in particular to the higher-level control system. For example, the communication interface 41 is implemented as a fieldbus connection. Exemplarily, the control section 40 further comprises a voltage supply connection 71.

The valve module carrier 2 expediently comprises a carrier section 39, on the top side of which the first valve module 1 and the second valve modules 25 are mounted. The carrier section 39 expediently adjoins the control section 40 in the y-direction. The carrier section 39 is expediently plate-shaped and can in particular also be referred to as a connection plate. The first valve module 1 and the further valve modules 25 are lined up next to each other in the y-direction on the carrier section 39. In particular, the second valve modules 25 are arranged offset from the first valve module 1 on the valve module carrier 2 in the line-up direction y aligned perpendicular to the longitudinal direction x. The first valve module 1 and the second valve modules 25 form a row extending in the y direction. The first valve module 1 is expediently arranged at the first row position. Each subsequent second valve module 25 in the row is expediently arranged directly next to the preceding valve module in the row in the y-direction.

Expediently, the first valve module 1 and the second valve modules 25 together form a cuboid valve module block. The first valve module 1 and the further valve modules 25 are arranged directly next to each other. Preferably, the first valve module 1 and the further valve modules 25 are arranged in alignment with each other in the x-direction. Expediently, the first valve module 1 and the second valve modules 25 each have the same x-extension. The x-extension of the first valve module 1 and the further valve modules 25 is expediently at least 70% of the x-extension of the carrier section 39.

The second valve modules 25 are expediently plate-shaped and are oriented with their longitudinal axes in the x-direction. The second valve modules 25 expediently each comprise a main valve section 45 (hereinafter also referred to as "second main valve section") with a main valve 56 (hereinafter also referred to as "second main valve"). The main valve 56 is suitably configured as a 5/2-way valve.

Further, the valve modules 25 each include a pilot section 46 (hereinafter also referred to as "second pilot section") having a pilot valve 62 (hereinafter also referred to as "second pilot valve") for actuating the respective second main valve 56. The pilot valves 62 are configured, for example, as solenoid valves.

The second valve modules 25 expediently further comprise a respective placeholder module 47, which preferably has no fluidic and/or no electrical function. The second valve modules 25 are expediently designed to be single-acting. In particular, the second valve modules 25 are of monostable design.

In the second valve modules 25, the main valve sections 45, the pilot sections 46, and the placeholder modules 47 are each expediently designed as longitudinal sections that adjoin one another in the x-direction. Thus, in each second valve module 25, the pilot section 46 adjoins the main valve section 45 in the x-direction and the placeholder module 47 adjoins the pilot section 46 in the x-direction.

According to an alternative embodiment (not shown), one, more or all of the second valve modules 25 have a further pilot section instead of the placeholder module 47, which adjoins the pilot section 46 in the x-direction.

The second main valve sections 45 expediently have the same x-extension as the first main valve section 8. Exemplarily, the second main valve sections 45 are designed identically to the first main valve section 8 with respect to all external dimensions, in particular with respect to their external shape. Preferably, the second main valve sections 45 occupy the same x-range as the first main valve section.

The second pilot sections 46 expediently have the same x-extension as the first pilot section 10. Exemplarily, the second pilot sections 46 are designed identically to the first pilot section 10 with respect to all external dimensions, in particular with respect to their external shape. Preferably, the second pilot sections 46 are identical to the first pilot section 10. Preferably, the second pilot sections 46 occupy the same x-range as the first pilot section 10.

The placeholder modules 47 expediently have the same x-extension as the pressure sensor section 12. Exemplarily, the placeholder modules 47 are designed identically to the pressure sensor section 12 with respect to their outer dimensions. Preferably, the placeholder modules 47 occupy the same x-range as the pressure sensor section 12.

Insofar as a further pilot section is present instead of a placeholder module 47, then the further pilot section expediently has the same x-extension as the pressure sensor section 12 or 12A. Exemplarily, the further pilot section is designed identically to the pressure sensor section 12 or 12A with respect to one, more or all of its outer dimensions. For example, in the case of the pressure sensor section 12, all of the external dimensions—i.e. in the x-direction, y-direction and z-direction—are identical to the corresponding external dimensions of the further pilot section. In the pressure sensor section 12A, for example, the outer dimensions in the x-direction and/or y-direction are identical to the corresponding outer dimensions of the further pilot section. For example, in the pressure sensor section 12A, the outer dimension in the z-direction excluding the second electrical terminal 22 is identical to the outer dimension in the z-direction of the further pilot section. The further pilot section preferably occupies the same x-range as the pressure sensor section 12 or 12A.

The mounting locations of the valve module carrier 2 provide sufficient space in the longitudinal direction x for the second valve module 25 with a main valve section 45, a pilot section 46 adjoining the main valve section 45 in the longitudinal direction x, and a placeholder module 47 (or a further pilot section) adjoining the pilot section 46 in the longitudinal direction x. The pressure sensor section 12 of the first valve module 1 occupies, in the longitudinal direction x, the installation space provided for the placeholder module 47 or the further pilot section.

The valve module carrier 2, in particular the carrier section 39, further comprises a front side 43 aligned perpendicular to the top side. The front side 43 is expediently aligned perpendicular to the x-direction. In particular, the front side 43 is a longitudinal side of the valve module carrier 2. A plurality of fluid line ports 44 are arranged on the front side 43. Exemplarily, the fluid line ports 44 are arranged in two rows vertically offset from each other. The fluid line ports 44 are expediently cylindrical, with the cylinder axes aligned parallel to the x-direction in each case. The fluid line ports 44 are, in particular, hose connections to each of which a fluid line hose can be connected.

Exemplarily, the first valve module 1 serves to supply the further valve modules 25 with pressurized fluid. The first valve module 1 can therefore also be referred to as a supply valve module and the second valve modules 25 can also be referred to as consumer valve modules.

In particular, each second valve module 25 is configured to use the pressurized fluid supplied by the first valve module 1 to actuate its second main valve 56. Expediently, each of the second valve modules 25 is configured to use the pressurized fluid supplied by the first valve module 1 to actuate the second main valve 56 via its second pilot valve 62 to cause the second main valve 56 to switch. The pressurized fluid supplied by the first valve module 1 may also be referred to as auxiliary control air.

Each of the second valve modules 25 is expediently associated with at least one of the fluid line ports 44. Preferably, two fluid line ports 44 are assigned to each of the second valve modules 25, which are expediently arranged in the same y-range as the respective second valve module 25. Each of the second valve modules 25 is expediently designed to selectively aerate or de-aerate the at least one assigned fluid line port 44 by switching the second main valve 56.

The fluid line ports 44 associated with the second valve modules 25 may also be referred to as working ports 63 and are expediently used to supply pressurized fluid to an external fluidic unit 64, such as a fluidic actuator, particularly a drive cylinder.

The pressurized fluid supply outlet 24 of the first valve module 1 is used to supply pressurized fluid to the second valve modules 25 located on the valve module carrier 2. The pressurized fluid supply outlet 24 can be selectively aerated or de-aerated via the first main valve 9.

In a preferred embodiment, the first valve module 1 is a safety module and is configured to de-aerate the pressurized fluid supply outlet 24 by means of the first main valve 9 in response to a safety command, for example an emergency stop command, to ensure that the second main valves 56 of the second valve modules 25 are not aerated and/or not actuated. The valve arrangement 38 is expediently configured to verify by means of the pressure sensor 13 that the pressurized fluid supply outlet 24 is de-aerated, expediently in response to the safety command and/or the de-aeration of the pressurized fluid supply outlet 24. Exemplarily, the valve arrangement 38 checks by means of the pressure sensor 13 whether the fluid pressure of the pressurized fluid supply outlet 24 is below a predetermined threshold, in particular to verify that the pressurized fluid supply outlet 24 is de-aerated.

Exemplarily, one of the fluid line ports 44 is designed as a pressurized fluid supply port 48, via which the first valve module 1 and/or the second valve modules 25 are supplied with pressurized fluid. Exemplarily, a fluid line port 44 arranged in the same y-region as the first valve module 1 is designed as the pressurized fluid supply port 48. In particular, the pressurized fluid supply port 48 is fluidically connected to the pressurized fluid supply inlet 26 so that pressurized fluid can be provided to the pressurized fluid supply inlet 26 via the pressurized fluid supply port 48.

FIG. 6 shows a fluidic circuit diagram of a fluidic system comprising the valve arrangement 38, a pressurized fluid source 61, and a plurality of external fluidic units 64 (for example, pneumatic drive cylinders). The fluidic system expediently further comprises a pressurized fluid supply 59 and/or the pressurized fluid sink 60.

Pressurized fluid from the pressurized fluid source 61 is supplied to the first main valve 9 via the pressurized fluid supply port 48. In the second main valve position, the main valve 9 provides this pressurized fluid at the pressurized fluid supply outlet 24. Via a supply channel 51 extending in the carrier section 39, the pressurized fluid is supplied to the second valve modules 25, each of which is connected to the supply channel 51. The supply channel 51 is expediently a pilot channel. In particular, the supply channel 51 provides auxiliary control air to the second valve modules 25. The pressurized fluid supply port 48 may also be referred to as an auxiliary control air supply port.

The following explanation, referring to a second valve module 25, expediently applies to several, in particular to all second valve modules 25: By means of the second pilot valve 62, the second valve module 25 selectively connects the pressure chamber 65 (hereinafter referred to as "second pressure chamber") of the second main valve 56 to the supply channel 51 (to aerate the second pressure chamber 65 and actuate the second main valve 56) or to a pressurized fluid sink 60 (to de-aerate the second pressure chamber 65 so that the second main valve 56 is not actuated). The second pressure chamber 65 is expediently de-aerated to the pressurized fluid sink 60, for example the atmosphere, via an area silencer 69 (see FIG. 5). Exemplarily, the area silencer 69 is arranged next to the valve module 1 in the line-up direction y. Exemplarily, the area silencer 69 is arranged in the same y-range as the working fluid supply port 67. The second main valve 56 is fluidically connected to the external fluidic unit 64 via the working port 63. Depending on whether the second main valve 56 is actuated (by the second pilot valve 62), the second main valve 56 selectively connects the working port 63 to the pressurized fluid sink 60 (in particular, in the non-actuated state of the second main valve 56) or to a pressurized fluid supply 59 (in particular, in the actuated state of the second main valve 56). The pressurized fluid supply 59 is, for example, the pressurized fluid source 61 or, alternatively, another pressurized fluid source.

Figure 7:
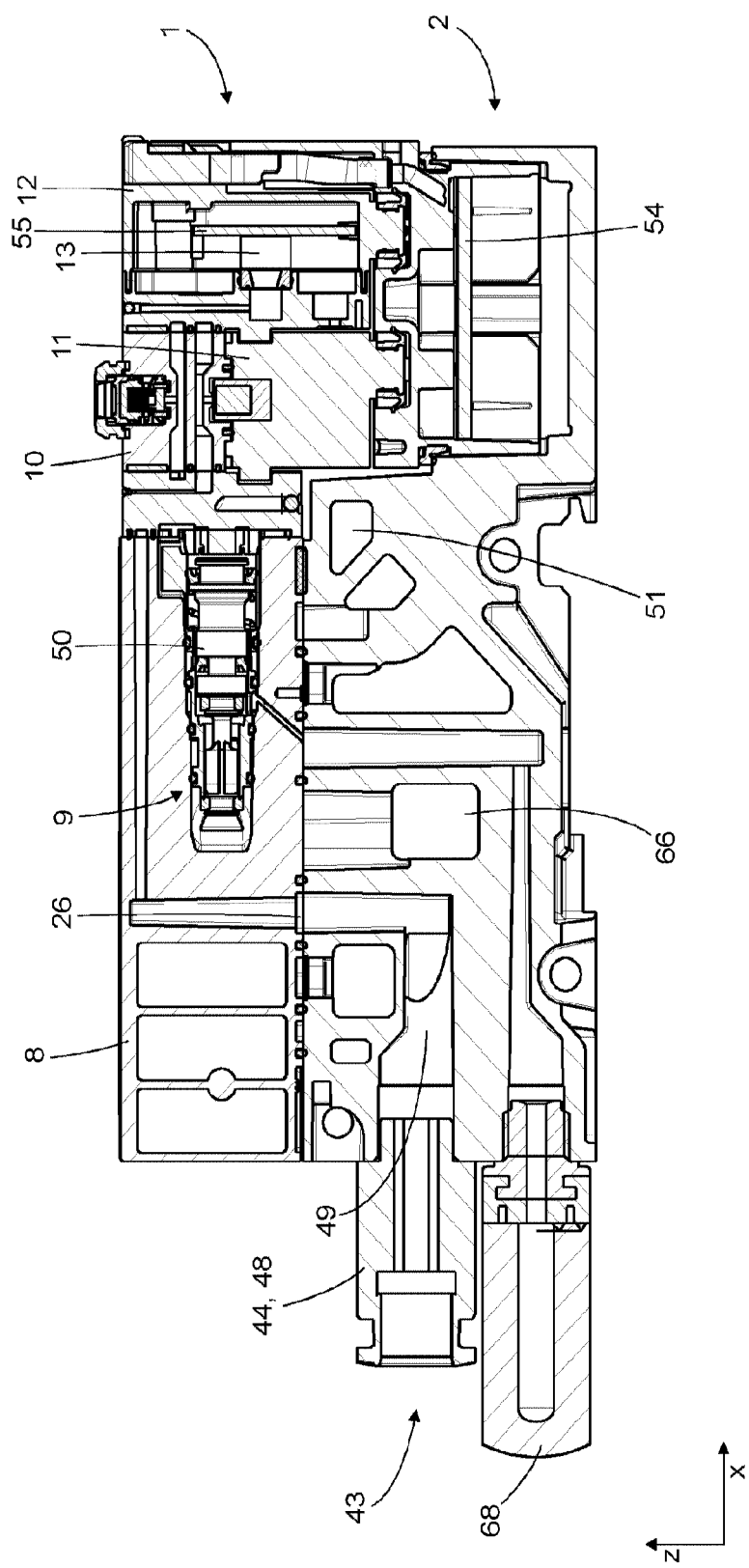

FIG. 7 shows an x-z section through the first valve module 1 and the valve module carrier 2.

From the pressurized fluid supply port 48 arranged on the front side 43 of the valve module carrier 2, a supply fluid channel 49 runs through the carrier section 39 to the pressurized fluid supply inlet 26. The supply fluid channel 49 has an exemplary L-shaped course and opens out on the top side of the valve module carrier 2. The pressurized fluid supply inlet 26 of the first valve module 1 is arranged on the bottom side of the main valve section 8 of the first valve module 1 and is located directly above the outlet of the supply fluid channel 49. As shown schematically in FIG. 4, a first valve module fluid channel 30 runs from the pressurized fluid supply inlet 26 to the first main valve 9. As shown in FIG. 7, the first main valve 9 has a valve member 50, which is designed in particular as a piston spool. The second valve module fluid channel 32 leads from the main valve 9 to the pressurized fluid supply outlet 24 (see FIG. 4).

The pressurized fluid supply outlet 24 is fluidically connected to the supply channel 51 of the valve module carrier 2. The supply channel 51 expediently runs in the carrier section 39, in particular under the second valve modules 25. Exemplarily, the supply channel 51 runs in the y-direction. In particular, the supply channel 51 leads to each of the second valve modules 2. Via the supply channel 51, the second valve modules 25 are supplied with the pressurized fluid required for actuating the second main valves 56.

Expediently, a working fluid channel 66 extends in the carrier section 39, in particular below the second valve modules 25. The working fluid channel 66 expediently serves to fluidically connect the aforementioned pressurized fluid supply 59 to the second main valves 56. Exemplarily, the working fluid channel 66 is fluidically connected to the pressurized fluid supply 59 via a working fluid supply port 67. In an exemplary embodiment, the working fluid supply port 67 is disposed on the front side 43 of the valve module carrier 2. The working fluid supply port 67 serves to provide the second main valves 56 with the pressurized fluid, in particular the compressed air, which can be output via the working ports 63.

Furthermore, a third valve module fluid channel 52 leads from the second valve module fluid channel 32 to the pressure sensor 13. In particular, the third valve module fluid channel 52 runs from the main valve section 8 via the pilot section 10 to the pressure sensor section 12. The third valve module fluid channel 52 is expediently permanently connected to the second valve module fluid channel 32.

As shown in FIG. 7, the pressure sensor section 12 includes a pressure sensor circuit board 55. Expediently, the pressure sensor 13 is mounted on the pressure sensor circuit board 55. The pressure sensor circuit board 55 is oriented with its board plane perpendicular to the x-direction.

In an exemplary embodiment, the valve module carrier 2 includes the circuit board 54. The circuit board 54 is located below the pilot section 10 and the pressure sensor section 12. The circuit board 54 is oriented with its board plane perpendicular to the z-direction.

In operation, the valve arrangement 38 is connected with the pressurized fluid supply port 48 to the pressurized fluid source 61 and is operated, in particular, as follows:

First, the first pilot valve 11 is actuated with an electrical actuation signal to move it to the second pilot valve position, thereby setting the first main valve 9 to the second main valve position so that the pressurized fluid supply outlet 24 and thus the supply channel 51 are fluidically connected to the pressurized fluid source 61 and are thus aerated.

Next, a normal operation is carried out in which the second pilot valves 62 of the second valve modules 25 are controlled with electrical actuation signals to cause the second pressure chambers 65 of the second main valves 56 to be acted upon by the pressurized fluid supplied via the supply channel 51, so that the second main valves 56 are switched, in particular actuated. Expediently, the second main valves 56 are moved into a position in which the working ports 63 associated with the second valve modules 25 are aerated. Exemplarily, the external fluidic units 64 are connected to these working ports 63, which external fluidic units 64 are actuated via the aeration of the working ports 63.

Next, the first pilot valve 11 is controlled with a safety command, for example an emergency stop command, so that the pilot valve 11 is moved to the first pilot valve position, thereby moving the first main valve 9 to the first main valve position, so that the pressurized fluid supply outlet 24 and thus also the supply channel 51 are de-aerated. In this way (irrespective of the position of the second pilot valves 62), the second pressure chambers 65 are de-aerated and the second main valves 56 are thus moved to a (particularly non-actuated) position in which, expediently, the working ports 63 are de-aerated.

Optionally, the second pilot valves 62 are further controlled (for example, by means of a safety command) such that they fluidically connect the second pressure chambers 65 to the pressurized fluid sink 60.

Next, the pressure sensor 13 is used to verify whether the pressurized fluid supply outlet 24 is de-aerated. Expediently, fluid pressure information and/or verification information is provided to indicate the result of the verification—in particular, whether the pressurized fluid supply outlet 24 is actually de-aerated.

According to a possible embodiment, the pressure sensor 13 is configured to provide fluid pressure information according to the detected fluid pressure of the pressurized fluid supply outlet 24. The fluid pressure information comprises, for example, the detected fluid pressure, in particular as a pressure value. The valve arrangement 38 is expediently configured to compare the fluid pressure information, in particular the pressure value, to a threshold value to verify that the pressurized fluid supply outlet 24 is de-aerated. For example, the valve arrangement 38 verifies that the pressure value is less than the threshold value. If the pressure value is less than the threshold value, the valve arrangement 38 provides a first verification information indicating that the pressurized fluid supply outlet 24 has been verified to be de-aerated. If the pressure value is greater than the threshold value, the valve arrangement 38 provides second verification information indicating that the de-aeration of the pressurized fluid supply outlet 24 could not be verified. The second verification information is, for example, an error signal. Expediently, the valve arrangement 38 comprises a control unit, for example a microcontroller, which performs the comparison between the pressure value and the threshold value and provides either the first verification information or the second verification information according to the result of the comparison. The control unit may be arranged on the printed circuit board 54, for example. Furthermore, the control unit may also be arranged in the pressure sensor section 12, in particular on the pressure sensor circuit board 55.

Preferably, the valve arrangement 38 is adapted to perform the verification of de-aeration, in particular the comparison between the pressure value and the threshold value, in response to the provision of the aforementioned safety command. Preferably, the valve arrangement 38 is adapted to provide the second verification information in response to the fact that the pressurized fluid supply outlet 24 is supposed to be de-aerated but (according to the fluid pressure information) is not de-aerated—i.e., in particular in response to the fact that an expectation (the de-aeration of the pressurized fluid supply outlet 24) is not met.

Exemplarily, the pressurized fluid supply outlet 24 has a pressure of 3 to 8 bar or of 2 to 10 bar in the aerated state. The threshold value is expediently less than 1 bar, in particular less than 0.5 bar. Exemplarily, the threshold value is 200 millibars. In the de-aerated state, the pressurized fluid supply outlet 24 expediently has a fluid pressure of less than 200 millibars.

According to one possible embodiment, a system comprising the valve arrangement 38 is provided. The system is adapted to perform an emergency shutdown, for example of an actuator, a power supply, or a pressurized fluid supply, in response to the error signal.

Expediently the valve arrangement 38 and/or a higher-level control system is configured to perform an emergency shutdown in response to the error signal.

The invention claimed is:

1. A valve module for mounting on a valve module carrier, the valve module being of plate-shaped design, extending in a longitudinal direction, and being subdivided into a plurality of longitudinal sections adjoining one another in the longitudinal direction, the valve module having, as a first longitudinal section, a main valve section with a first main valve, and, as a second longitudinal section adjoining the main valve section in the longitudinal direction, a pilot section with a pilot valve for actuating the first main valve, the valve module further having, as a third longitudinal section adjoining the pilot section in the longitudinal direction, a pressure sensor section with a pressure sensor for detecting a fluid pressure of the valve module,
wherein the main valve section is designed as a main valve module, the pilot section is designed as a pilot control module which is placed onto the main valve section in the longitudinal direction, and the pressure sensor section is designed as a pressure sensor module which is placed onto the pilot section in the longitudinal direction.

2. The valve module according to claim 1, wherein the pressure sensor section comprises an electrical interface for providing fluid pressure information detected by the pressure sensor, verification information and/or for receiving a control signal for controlling the pilot valve.

3. The valve module according to claim 2, wherein the electrical interface comprises a first electrical terminal arranged on a bottom side of the valve module and/or a second electrical terminal arranged on a top side of the valve module, wherein the bottom side of the valve module is the side with which the valve module is attachable to the valve module carrier, and the top side is the side oriented opposite to the bottom side.

4. The valve module-according to claim 1, wherein the pressure sensor serves to detect the fluid pressure of a pressurized fluid outlet of the valve module, the pressurized fluid outlet being switched by the first main valve.

5. The valve module according to claim 4, wherein the pressurized fluid outlet is a pressurized fluid supply outlet for supplying pressurized fluid to further valve modules located on the valve module carrier and the pressurized fluid supply outlet can be selectively aerated or de-aerated via the first main valve.

6. A valve arrangement, comprising a valve module carrier, on which a first valve module is mounted, the first valve module valve module being of plate-shaped design, extending in a longitudinal direction, and being subdivided into a plurality of longitudinal sections adjoining one another in the longitudinal direction, the valve module having, as a first longitudinal section, a main valve section with a first main valve, and, as a second longitudinal section adjoining the main valve section in the longitudinal direction, a pilot section with a pilot valve for actuating the first main valve, the valve module further having, as a third longitudinal section adjoining the pilot section in the longitudinal direction, a pressure sensor section with a pressure sensor for detecting a fluid pressure of the valve module,
wherein the main valve section is designed as a main valve module, the pilot section is designed as a pilot control module which is placed onto the main valve section in the longitudinal direction, and the pressure sensor section is designed as a pressure sensor module which is placed onto the pilot section in the longitudinal direction,
the valve module further comprising at least one second valve module, which is arranged on the valve module carrier offset relative to the first valve module in a line-up direction aligned perpendicular to the longitudinal direction, the second valve module having a second main valve and being adapted to use the pressurized fluid supplied by the first valve module via the pressurized fluid supply outlet to actuate the second main valve.

7. The valve arrangement according to claim 6, wherein the first valve module is a safety module and is adapted, in response to a safety command, to de-aerate the pressurized fluid supply outlet by means of the first main valve to ensure that the second main valve is not aerated, and is further adapted to verify by means of the pressure sensor that the pressurized fluid supply outlet is de-aerated.

8. The valve arrangement according to claim 7, wherein the safety command is an emergency stop command.

9. The valve arrangement according to claim 6, wherein the valve module carrier has a plurality of mounting locations for valve modules, wherein the mounting locations in the longitudinal direction have space for a valve module with a main valve section, a first pilot section adjoining the main valve section in the longitudinal direction, and a further pilot section or placeholder module adjoining the first pilot section in the longitudinal direction, and wherein the pressure sensor section occupies, in the longitudinal direction, the space provided for the second pilot section or placeholder module.

10. The valve arrangement according to claim 6, wherein the valve module carrier comprises a top side on which the first valve module and the second valve module are mounted, and further comprises a front side aligned perpendicular to the top side, on which front side a plurality of fluid line ports are arranged, wherein one of the fluid line ports is configured as a pressurized fluid supply port that is fluidically connectable to the pressurized fluid supply outlet via the first main valve.

11. A method of operating a valve arrangement comprising a valve module carrier, on which a first valve module is mounted, the first valve module valve module being of plate-shaped design, extending in a longitudinal direction, and being subdivided into a plurality of longitudinal sections adjoining one another in the longitudinal direction, the valve module having, as a first longitudinal section, a main valve section with a first main valve, and, as a second longitudinal section adjoining the main valve section in the longitudinal direction, a pilot section with a pilot valve for actuating the first main valve, the valve module further having, as a third longitudinal section adjoining the pilot section in the longitudinal direction, a pressure sensor section with a pressure sensor for detecting a fluid pressure of the valve module, wherein the main valve section is designed as a main valve module, the pilot section is designed as a pilot control module which is placed onto the main valve section in the longitudinal direction, and the pressure sensor section is designed as a pressure sensor module which is placed onto the pilot section in the longitudinal direction, the valve arrangement further comprising at least one second valve module, which is arranged on the valve module carrier offset relative to the first valve module in a line-up direction aligned perpendicular to the longitudinal direction, the second valve module having a second main valve and being adapted to use the pressurized fluid supplied by the first valve module via the pressurized fluid supply outlet to actuate the second main valve, the method comprising the steps of: de-aerating the pressurized fluid supply outlet by means of the main valve and verifying the de-aeration of the pressurized fluid supply outlet by means of the pressure sensor.

* * * * *